Nov. 10, 1970   L. F. GUENTHER ET AL   3,538,725
HOOD LOCKING DEVICE
Filed Oct. 31, 1968   2 Sheets-Sheet 1
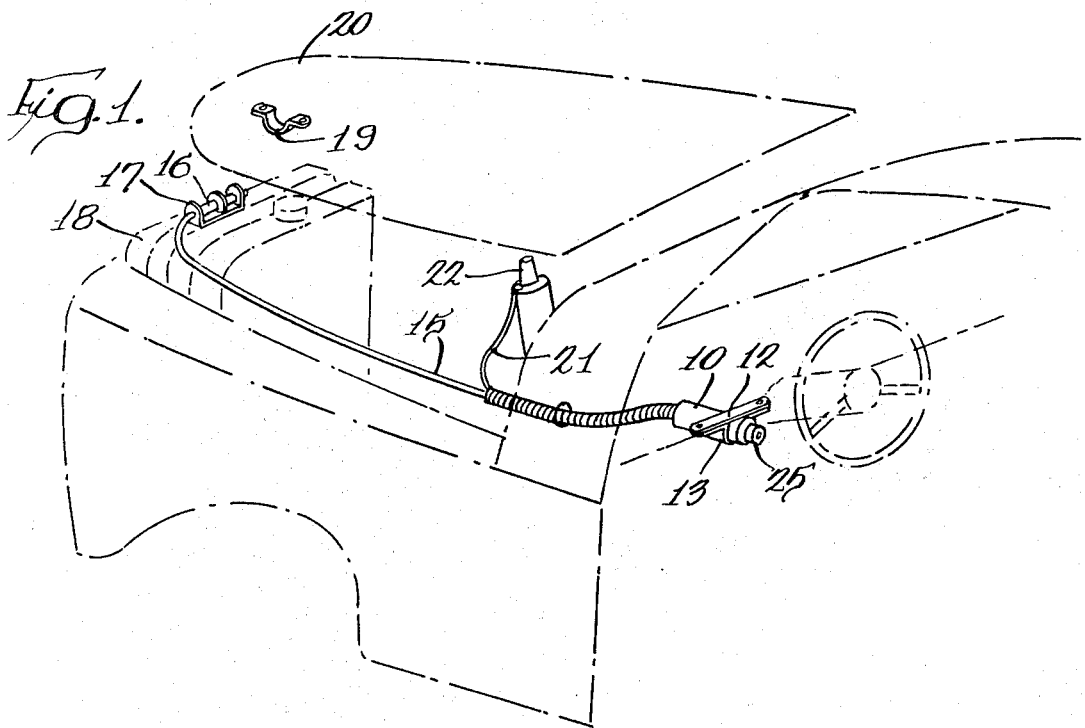
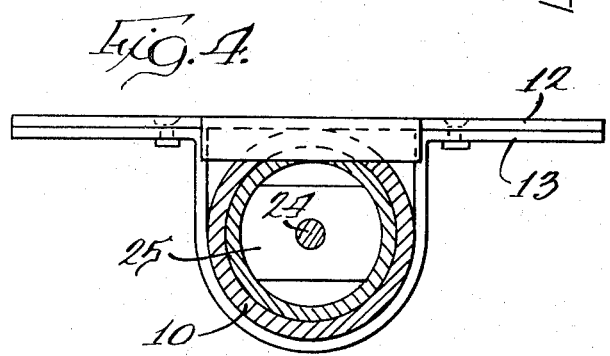
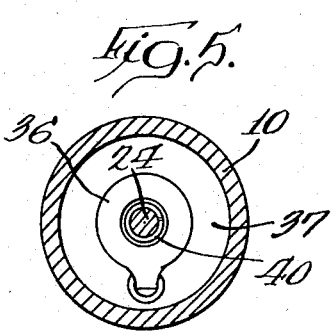
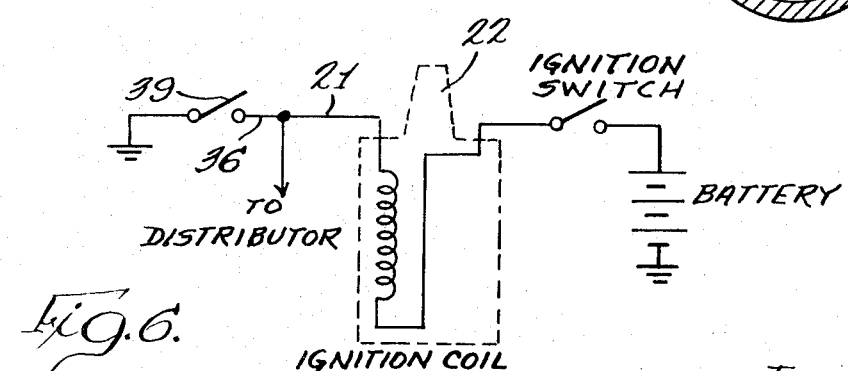
Inventors:
Louis F. Guenther
Charles P. Barcik
By Gary Parker,
Juettner Pigott & Cullinan
Attys Nov. 10, 1970   L. F. GUENTHER ET AL   3,538,725
HOOD LOCKING DEVICE
Filed Oct. 31, 1968   2 Sheets-Sheet 2
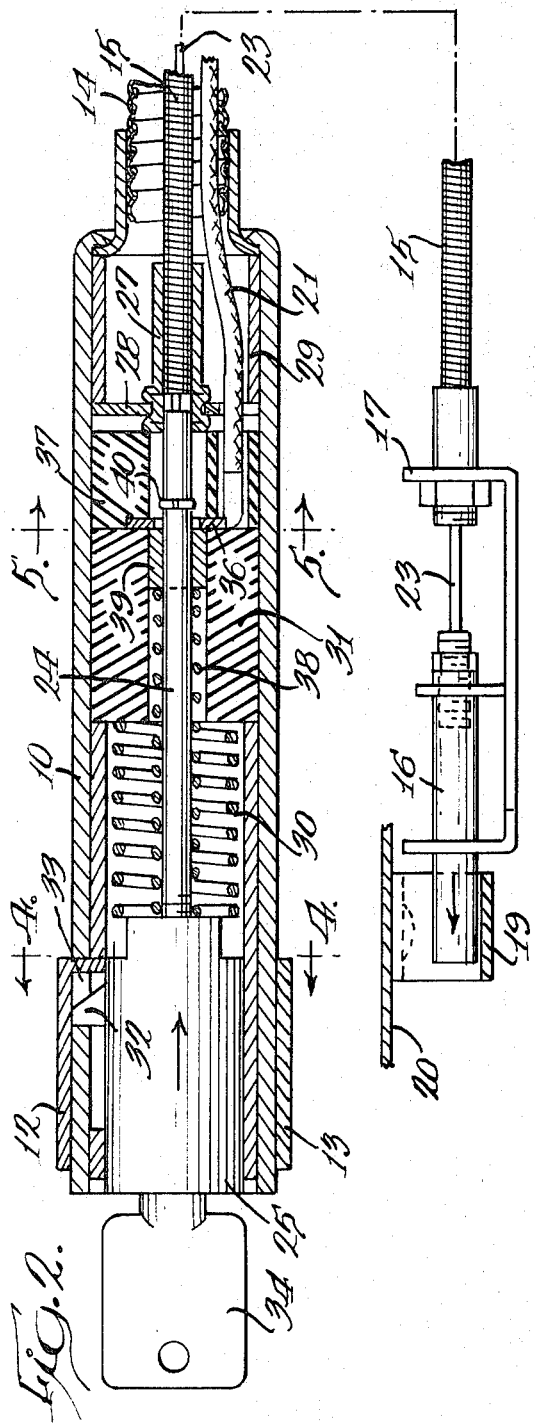
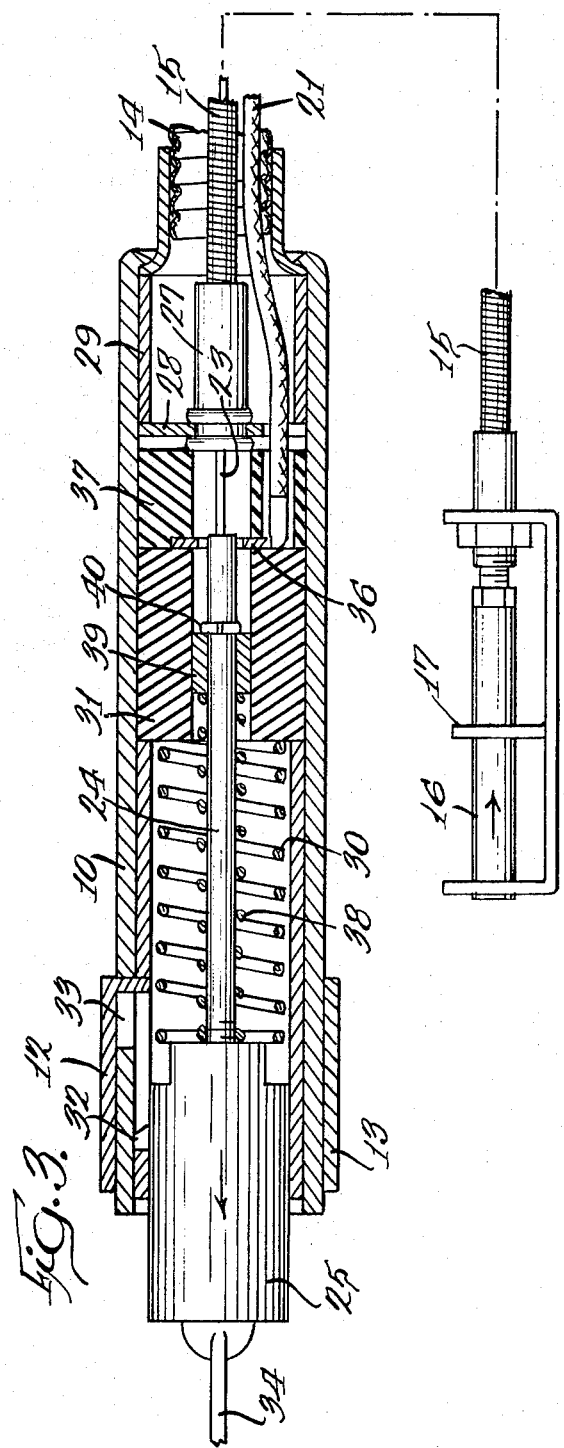
Inventors:
Louis F. Guenther
Charles P. Barcik
By Gary Parker,
Juettner, Pigott & Cullinan
Attys

United States Patent Office 3,538,725
Patented Nov. 10, 1970

3,538,725
HOOD LOCKING DEVICE
Louis F. Guenther, Park Ridge, and Charles P. Barcik, Franklin Park, Ill., assignors to CFC Enterprises, Park Ridge, Ill., a partnership
Filed Oct. 31, 1968, Ser. No. 772,100
Int. Cl. E05b 65/12
U.S. Cl. 70—241                 2 Claims

ABSTRACT OF THE DISCLOSURE

An automobile locking device comprising a remotely controllable bolt for locking the hood to the automobile body and associated electrical means for alternately rendering the ignition system of the automobile operative and inoperative in response to reciprocable movement of said bolt and independently of the automobile starter system.

---

This invention relates to an improved novel device to prevent the theft of accessories under the hood of an automobile such as its battery, alternator, air conditioner, carburetor, etc. as well as the theft of the automobile itself. The invention is characterized by its simplicity of construction and simplicity of installation making it relatively easy for the owner or operator to install the device quickly and readily operate it, so that the hood and the automobile ignition can be locked quickly without the use of a key and conversely can be quickly unlocked by a key that unlocks the hood and the ignition. It is not dependent upon solenoids or other electrical energizing mechanisms but is of rather a spring loaded automatic operation so all automatic operations are mechanical in nature.

The device of the present invention is relatively compact and its operating mechanism is contained in a steel tube of about 1⅛″ in diameter and the mechanism readily secured in place by two metal stamping parts which are inserted in place to form a bracket and permanently riveted to seal all of the working parts in the steel tube thereby to prevent any tampering. The parts of the tube primarily consist of a specially designed electrical switch and a sliding lock tumbler. The electrical switch has a slidable rod that receives a slidable bushing and is connected to one end of the control cable, sometimes referred to as a Bowden wire, and the other end directly connected to the lock tumbler thereby making integral the electric switch and the lock tumbler. The electric switch is automatically controlled by its individual spring and is so timed to make contact when the locking device of the present invention is in its locked position. The lock tumbler is also automatically controlled by its individual spring and it too is timed to lock the hood of the automobile at the same time the electrical switch makes contact to short out the engine.

After the locking device of the present invention is mounted on or adjacent to the dashboard of the automobile to operate it, the operator of the automobile merely presses the spring loaded lock tumbler with thumb or finger until a click is heard. This moves the control cable or Bowden wire and actuates the slide bolt mounted under the hood into locked position at the same time that the electrical contact bushing moves into position completing the circuit and shorting the engine which prevents the starting of the automobile engine even though the operator inserts the original equipment ignition key and tries to start the engine. In this case, the starter will turn over the engine but the ignition being shorted will not give spark to the combustion chamber until the locking device of the present invention is also unlocked.

The device of the present invention is constructed and arranged so that one unlocks the hood and ignition when driving, and conversely locks the lock and shorts the ignition when leaving the car. Thus, two keys are required to start the engine, one being the conventional ignition key and the second being the key which operates the lock of the present invention and releases the shorting of the ignition system.

The objects and advantages of the present invention, its details of construction and arrangement of parts will be further apparent from a consideration of the following specification and accompanying drawings, wherein:

FIG. 1 is a perspective view of the device of the present invention installed on an automobile.

FIG. 2 is a longitudinal view with parts in section of the locking device of the present invention in locked position.

FIG. 3 is a view similar to that of FIG. 2 with the device in unlocked position.

FIG. 4 is a section on the line 4—4 of FIG. 2.

FIG. 5 is a section on the line 5—5 of FIG. 2.

FIG. 6 is a diagrammatic illustration of the electrical circuit of the present invention.

Referring to the drawings, the reference numeral 10 indicates the elongated steel tube housing the lock of the present invention illustrating the reciprocally received cylindrical tumbler lock 11 projecting therefrom when the tube 10 is engaged to the dashboard of the automobile by the clamp parts 12 and 13. Extending rearwardly from the tube 10 is a shielding electrical cable 14 which houses the Bowden wire 15, the latter being connected to the bolt 16 mounted in the housing 17 on the automobile chassis 18. The bolt 16 upon reciprocation is adapted to be received within the hook or keeper 19 mounted under the hood 20 of the automobile.

Extending from the shielding 14 is the conduit wire 21 extending to the side of the coil 22 leading to the distributor, not shown.

The locking device of the present invention, as previously indicated, comprises the cylindrical tube or housing 10, the rearward end of which receives the Bowden wire 15. This Bowden wire which conventionally comprises a shielded outer cable portion and an inner flexible wire portion 23, with the inner terminus of the wire portion 23 connected to the slidable rod 24, the opposed end of said rod being threaded into the cylindrical tumbler lock 25 as at 26.

At its entrance end, the Bowden wire 15 is received by the bushing 27 carrying the annular ring 28 fixed thereto retaining the split ring 29 disposed within the cylinder 10.

The cylindrical tumbler lock 25 is normally pressed by means of the spring 30 which acts between the base of the lock 25 and the annular body 31 which may suitably be composed of an insulating body such as a plastic composition. The lock 25 is further provided with a spring pressed tongue 32 which is receivable in an opening 33 in cylinder 10, and in locked position shown in FIG. 2 the tongue 32 is adapted to abut against the defines of the opening 33 to maintain the lock 25 pressed inwardly against the action of spring 30. On turning of the key 34 the tongue 32 is retracted and the tumbler cylinder 25 caused to project outwardly against action of spring 30 as shown in FIG. 3. The Bowden wire and the rod 24, being operably associated with tumbler lock 25, is adapted to reciprocate therewith and to cause the bolt 16 to reciprocate therewith inwardly and out of engagement with the keeper 19 on the hood 20 of the automobile for locking and unlocking engagement.

As previously indicated, there is also associated with our locking device electrical operating mechanism which although mechanical and spring pressed causes the ignition system to be shorted out when the lock 25 is pressed inwardly as shown in FIG. 2 so that the automobile cannot be started even if the ignition key is turned. Conversely when the lock is opened as shown in FIG. 3 the ignition system is returned to normal condition and the turning of the conventional ignition key will permit the automobile to be started in a normal manner. This is accomplished by the electrical conduit 21 which extends into the rear end of the tube 10 and a notch in annular ring 28, the conduit terminating in the annular metal ring 36 carried on one face of the annular tubular body 37 disposed within cylinder 10. Disposed within the annulus of the body 31 is coil spring 38 which at one end abuts against the inner base of lock 25, and at its outer end against the annular contact ring 39. Thus, under pressure of spring 38, contact ring 39 is brought into contact with the annular ring 36 carried in the face of body 37 and the ring 39, being grounded through spring 38, lock 25 and cylinder is secured to the dash of the automobile, shorts out the engine when the lock is closed. Thus, not only is the automobile protected by having the hood locked to the chassis of the automobile but at the same time its electrical circuit is grounded out so that the automobile engine is in inoperative position as shown in FIG. 2.

Upon turning of key 34 which permits lock 25 to reciprocate outwardly under the pressure of its spring 30, the rod 24 is reciprocated along with the lock 25 to draw forwardly the device 40 which may be in the form of a ring or ears on the rod 24. This ring or ear or ears 40 is of a dimension so that it passes through the annulus of ring 36 and into contact with slidable ring 39 which draws it out of contact with ring 36 as shown in FIG. 3 to thereby disconnect the short condition and place the automobile engine again in operative condition and to permit starting of the engine.

Thus, it will be seen that the purpose of our device is two fold. First, it locks the hood of the automobile thereby preventing anyone from lifting the hood and stealing the components and accessories contained beneath the hood and at the same time prevents lifting the hood so as to circumvent the ignition lock, and secondly our device prevents anyone from entering the automobile with master keys and start the engine and driving away with the car, since one cannot start the car without unlocking our lock thereby breaking the contact of the short-circuit switch.

It will thus be seen that in summary our device consists of a tubular lock attached to a control casing which may be mounted on the instrument panel of a car, and a specially designed short-circuit switch; the lock and attachments together with two compression springs being encased in a set of tubular housings, the housings being solid to receive the latch bolt of the lock and when the latch bolt falls into the lock the device is locked. To operate the hood and ignition short-circuit switch, one pushes in the tumbler lock against both compression springs until the lock snaps into locking position which pushes a plunger fastened to the extreme end of the casing and while it locks the hood of the automobile and at the same time actuates a switch to complete the circuit which shorts out the ignition.

We claim:
1. A locking device for the hinged hood of an automobile comprising a reciprocable bolt mounted on the chassis of the automobile and received by a keeper mounted on said hood, a Bowden wire operatively connected at one end with said bolt for reciprocating same to open and closed position with said keeper, a reciprocable rod connected at one end to the Bowden wire at the latter's opposed end, a housing, a first insulating body fixedly mounted within said housing, a rod mounted for reciprocal movement within said insulating body, a first spring member extending between said insulating body and a key actuatable cylindrical lock for urging said lock outwardly from said housing and simultaneously urging said bolt outwardly of said keeper, said lock including electrical conduit means extending at one end thereof outwardly of the said housing and adapted thereat to be connected to the side of the automobile coil leading to the distributor and connected at its opposed end to a stationary contact means mounted on a second insulating body fixedly mounted within said housing, a reciprocal contact ring mounted on said rod, a second spring member extending between said reciprocal contact ring and said lock for urging said reciprocal contact ring into contact with said stationary contact member to short the ignition system when the lock is closed in its inwardly reciprocated position and to open the ignition system when said stationary and reciprocal contact members are urged apart by action of said first spring forcing said lock outwardly of said casing and to simultaneously move said rod and said reciprocal contact member thereon.

2. The structure recited in claim 1 wherein said lock includes a spring pressed tongue adapted to be received in an aperture formed in said embracing cylinder and adapted to abut against the defining edge of said aperture when the lock is pressed inwardly of said cylinder with said bolt within said keeper against the action of said lock spring until the tongue is released from said engagement by key means for said lock.

References Cited
UNITED STATES PATENTS

| | | | |
|---|---|---|---|
| 1,276,117 | 8/1918 | Riebe | 64—4 |
| 1,481,498 | 1/1924 | Boggess | 70—241 |
| 1,846,782 | 2/1932 | Ballamos | 70—257 XR |
| 1,876,894 | 9/1932 | FitzGerald | 70—240 |
| 1,881,552 | 10/1932 | Hawkins | 70—257 XR |
| 1,997,050 | 4/1935 | Donovan | 70—241 |
| 3,465,558 | 9/1969 | Boyle | 70—181 |

FOREIGN PATENTS

| | | |
|---|---|---|
| 469,159 | 2/1952 | Italy. |
| 1,030,017 | 3/1953 | France. |
| 1,166,654 | 3/1964 | Germany. |

MARVIN A. CHAMPION, Primary Examiner

R. L. WOLFE, Assistant Examiner

U.S. Cl. X.R.

70—257, 360, 411